United States Patent [19]

Schafer et al.

[11] Patent Number: 5,731,019
[45] Date of Patent: Mar. 24, 1998

[54] COATED FOOD PRODUCT CONTAINING A NON-STARCH CONTAINING COATING COMPOSITION

[75] Inventors: Wolfgang Schafer, Langen; Manfred Schmiedel, Schiffdorf, both of Germany

[73] Assignee: Gorton's, Division of Conopco, Inc., Gloucester, Mass.

[21] Appl. No.: 611,735

[22] Filed: Mar. 6, 1996

[30] Foreign Application Priority Data

Mar. 10, 1995 [EP] European Pat. Off. ............. 95301579

[51] Int. Cl.⁶ ........................................... A23B 4/10
[52] U.S. Cl. .................. 426/99; 426/92; 426/102; 426/289; 426/292; 426/293; 426/302; 426/303; 426/601
[58] Field of Search ................. 426/89, 94, 102, 426/289, 292, 293, 302, 303, 291, 99, 92, 601

[56] References Cited

U.S. PATENT DOCUMENTS

| | | | |
|---|---|---|---|
| 3,830,941 | 8/1974 | Luft et al. | 426/99 |
| 4,330,566 | 5/1982 | Meyer et al. | 426/606 |
| 4,389,420 | 6/1983 | Yong et al. | 426/94 |
| 4,504,502 | 3/1985 | Earle et al. | |
| 4,504,509 | 3/1985 | Bell et al. | 426/549 |
| 4,808,423 | 2/1989 | Hansson. | |
| 4,846,097 | 7/1989 | Hansson. | |
| 4,897,275 | 1/1990 | Nagai et al. | |
| 4,961,940 | 10/1990 | Hansson. | |
| 5,492,707 | 2/1996 | Chalupa et al. | 426/302 |
| 5,527,549 | 6/1996 | Bernacchi et al. | 426/302 |

FOREIGN PATENT DOCUMENTS

| | | |
|---|---|---|
| 0235308 | 9/1987 | European Pat. Off. . |
| 0258957 | 3/1988 | European Pat. Off. . |
| 0319287 | 6/1989 | European Pat. Off. . |
| 0333886 | 9/1989 | European Pat. Off. . |
| 0530014 | 3/1993 | European Pat. Off. . |
| 0565386 | 10/1993 | European Pat. Off. . |
| 0612480 | 8/1994 | European Pat. Off. . |
| 2087852 | 12/1971 | France . |
| 2738403 | 3/1979 | Germany . |
| 4141448 | 6/1993 | Germany . |
| WO 94/18857 | 9/1994 | WIPO . |
| WO 94/22330 | 10/1994 | WIPO . |

OTHER PUBLICATIONS

Gessner Hawley, "Condensed Chemical Dictionary", p. 500, Feb. 1984.

*Primary Examiner*—Lien Tran
*Attorney, Agent, or Firm*—James J. Farrell

[57] ABSTRACT

A coated food product containing a non-starch containing coating composition is disclosed; the composition includes: 2 to 10% oligosaccharides, 3 to 12% soluble protein, 10–60% vegetable oil, 0 to 5% emulsifier, 13 to 85% water. The particular advantage of the use of this coating composition is that there is no longer the need to pre-fry the product prior to freezing, however a product is achieved having the desired pre-fried taste.

7 Claims, No Drawings

COATED FOOD PRODUCT CONTAINING A NON-STARCH CONTAINING COATING COMPOSITION

TECHNICAL FIELD OF THE INVENTION

The invention relates to a non-starch containing coating composition and its use as a coating for food products.

BACKGROUND TO THE INVENTION

It is desirable to provide coated food products, which are usually stored frozen, which have a crisp crumb coating after heating for consumption. This is particularly difficult to achieve when the food product to be coated includes a sauce and/or when the product is to be microwaved.

Traditional batters comprise flour which contains starch. Starch has a tendency to soak up water and hence become soggy. Thus a coating composition having no starch has been formulated which solves the above-mentioned problems.

DESCRIPTION OF THE INVENTION

Accordingly the invention provides a coating composition comprising;

2 to 10%, preferably 4 to 8% oligosaccharides 3 to 12%, preferably 5 to 10%, soluble protein 10 to 60%, preferably 30 to 60%, vegetable oil, 0 to 5% emulsifier 13 to 85%, preferably 17 to 61% water, wherein the coating composition does not contain starch.

Preferably the oligosaccharide is dried glucose syrup.

The soluble protein component may be selected from albumins, globulins, gliadins, glutenins, gelatin, muscle proteins and mixtures thereof. Preferably the soluble protein is albumin, most preferably egg white powder.

The vegetable oil may be any vegetable oil, preferably a vegetable oil selected from sunflower oil, soya bean oil and mixtures thereof.

A particular advantage of the use of this coating composition is that there is no longer the need to pre-fry the product prior to freezing. However a product is achieved with the desirable pre-fried taste. The oil content of a final product coated with this coating composition clearly depends on the actual level of oil in the coating composition as well as the thickness of the coating composition, but it will typically be between 3 and 12%, preferably approximately 6%.

The coating composition may be used to enrobe any food core, the food core may for example comprise, vegetables; meat such as poultry, lamb, beef, pork, veal; fish and mixtures thereof.

A crumb coating may be applied to the food core after the coating composition has been applied. Any crumb coating may be used, for example the commercially available Pandora Japanese crumbs, rice flakes and potato fresco crumbs. Traditional breadcrumbs may also be used.

Advantageously the crumb may be of the type disclosed in WO94/22330, WO94/18857, EP 319 287, EP 530 014, EP 235 308, EP 333 886 and EP 565 386.

EXAMPLES

Example 1

A coating composition having the following composition

|  | % w/w |
| --- | --- |
| Dried glucose syrup | 5 |
| Egg white powder | 7 |
| Soya oil | 45 |
| Emulsifier | 2.0 |
| Caramel Sugar | 1.5 |
| Water | to 100 |

The coating composition was used to enrobe a fish and sauce core prepared as follows;

A frozen fish block was cut into a 39 g cube shape having the dimensions 48×31×27 mm. This was moulded under pressure using an AEW press (pp330 & pp530) to form a blunted cone shape having a base diameter of 51 mm, a height of 27.7 mm, and a top diameter of 33 mm.

A sauce was prepared having the following composition:

|  | % w/w |
| --- | --- |
| Tomato paste (14 Brix) | 80 |
| Gelatin | 2.5 |
| Vegetable oil | 3.0 |
| Salt | 1.5 |
| Flavourings & herbs | 1.75 |
| Dried glucose syrup | 4.0 |
| Starch | 2.0 |
| Water | to 100 |

The sauce was frozen into a 13 g cone shape having a base diameter of 33 mm. The frozen pellet (at −10° C.) was dipped into a 2% sodium alginate solution at 10° C., any excess alginate was removed from the surface of the pellet by air jet prior to gelling in a 3% $CaCl_2$ solution for 3 minutes at 10° C.

The alginate gel encapsulated sauce was placed on top of the fish shape to form a cone.

The core was dipped in the coating composition described above before application of a layer of bread crumbs. A second layer of the coating composition and a layer of Pandora Japanese crumbs were then applied.

A 6 mm diameter hole was made in the top of the cone through the coating and alginate gel.

The product was stored frozen.

The product was cooked from frozen at 225° C. for 25 min. On eating the crumb coating was very crisp. The product had a desirable pre-fried taste.

Example 2

Example 1 was repeated except soya oil was replaced by sunflower oil. A product of similar quality to Example 1 was produced.

Comparative Example A

Example 1 was repeated except that a conventional batter having the following composition was used;

|  | % w/w |
| --- | --- |
| Wheat flour | 24 |
| Potato starch | 19 |
| Salt | 3 |
| Pepper extract | 0.1 |
| Water | to 100 |

A product having a poor taste and a soggy crumb was produced.

We claim:

1. A coated food product comprising a food core selected from the group consisting of vegetable, meat, fish and mixtures thereof, one or more layers of a coating composition; said coating composition comprising 2 to 10% oligosaccharides, 3 to 12% soluble protein, 10 to 60% vegetable oil, 0 to 5% emulsifier, 13 to 85% water, wherein the coating composition does not contain starch; said coated food product optionally comprises one or more layers of crumb.

2. The coated food product according to claim 1 wherein said coating composition comprises;
   4 to 8% oligosaccharides
   5 to 10% soluble protein
   30 to 60% vegetable oil
   0 to 5% emulsifier
   17 to 61% water.

3. The coated food product according to claim 1 wherein the oligosaccharide is dried glucose syrup.

4. The coated food product according to claim 1 wherein the soluble protein is selected from the group consisting of albumins, globulins, gliadins, glutenins, gelatin, muscle proteins and mixtures thereof.

5. The coated food product according to claim 1, wherein the soluble protein is albumin.

6. The coated food product according to claim 1, wherein the soluble protein is egg white powder.

7. The coated food product according to claim 1 wherein the food core additionally comprises a sauce.

* * * * *